(12) United States Patent
Cragun (10) Patent No.: US 6,557,027 B1
(45) Date of Patent: Apr. 29, 2003

(54) SYSTEM AND METHOD FOR MANAGING ON-LINE DISCUSSION HAVING MULTIPLE TOPICS IN A COLLABORATIVE DATA PROCESSING ENVIRONMENT

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/369,094

(22) Filed: Aug. 5, 1999

(51) Int. Cl.7 .............................................. G06F 13/00
(52) U.S. Cl. ...................... 709/204; 709/219; 709/329; 345/332
(58) Field of Search ................................ 709/204, 206, 709/217, 219, 328, 329; 345/329, 330, 331, 332

(56) References Cited

U.S. PATENT DOCUMENTS

| | | | |
|---|---|---|---|
| 5,694,163 A | | 12/1997 | Harrison ...................... 348/13 |
| 5,721,763 A | | 2/1998 | Joseph et al. ................. 379/88 |
| 5,784,568 A | | 7/1998 | Needham ............... 395/200.64 |
| 5,794,006 A | | 8/1998 | Sanderman ................. 395/500 |
| 5,894,305 A | * | 4/1999 | Needham .................... 345/329 |
| 6,061,716 A | * | 5/2000 | Moncreiff ................... 709/204 |
| 6,065,047 A | * | 5/2000 | Carpenter et al. .......... 709/218 |
| 6,151,622 A | * | 11/2000 | Fraenkel et al. ............ 709/205 |
| 6,212,548 B1 | * | 4/2001 | DeSimone ................. 709/204 |
| 6,393,460 B1 | * | 5/2002 | Gruen et al. ................ 709/204 |
| 6,417,819 B1 | * | 7/2002 | Matsumoto et al. ......... 345/1.1 |
| 6,484,196 B1 | * | 11/2002 | Maurille ..................... 709/206 |

OTHER PUBLICATIONS http://www.thehearth.com/mousepad/mousepad.html, printed Jan. 13, 1999.
http://www.zdnet.com/pcmag/issues11610/pcmag0046.htm, printed Feb. 8, 1999.
http://newircusers.com, printed Feb. 8, 1999.
http://newircusers.com/ircchat.html, printed Feb. 8, 1999.
http://newircusers.com/network.html, printed Feb. 8, 1999.
U.S. patent application Ser. No. 09/249,124.

* cited by examiner

Primary Examiner—Viet D. Vu
(74) Attorney, Agent, or Firm—Bracewell & Patterson, LLP; Roy W. Truelson (57) ABSTRACT

A data processing system that manages operator intercommunication in a collaborative data processing environment is capable of receiving first and second messages and respectively associated first and second sub-topic identifiers from a discussion forum, displaying each message associated with the first sub-topic identifier in a message window utilizing a first presentation format, and displaying each message associated with the second sub-topic identifier in the message window utilizing a second presentation format. In an illustrative embodiment, each message associated with the first sub-topic identifier is displayed in a first column in the message window and each message associated with the second sub-topic identifier is displayed in a second column in the message window.

33 Claims, 9 Drawing Sheets

SYSTEM AND METHOD FOR MANAGING ON-LINE DISCUSSION HAVING MULTIPLE TOPICS IN A COLLABORATIVE DATA PROCESSING ENVIRONMENT

BACKGROUND OF THE INVENTION

1. Technical Field

The present invention relates in general to data processing systems. In particular, the present invention relates to systems and methods for managing operator intercommunication in collaborative data processing environments.

2. Description of the Related Art

Before data processing systems became widely available, discussions involving three or more participants were usually conducted via in-person meetings or telephone conference calls. As data processing systems have become available to greater numbers of people, however, and as infrastructure for connecting those data processing systems (particularly the Internet) has grown, it has become possible for people stationed at different data processing system workstations to participate in a discussion without leaving their workstations and without using a traditional telephone conference call. Instead, the participants may communicate through their workstations.

Three of the most widely used systems for conveying messages between workstations.in a collaborative data processing environment are e-mail, discussion lists, and chat facilities. Of those three, chat facilities, which include such systems as Internet Relay Chat (IRC) and Web Page (or Java) Chat, provide the forum that most closely resembles a traditional meeting, in that a Chat forum enables three or more participants to receive and respond to comments from each other without significant delay.

Conventional Chat facilities are often used to manage discussions covering a number of related sub-topics within a particular topic. The present invention recognizes, however, that conventional Chat facilities lack means for clearly delineating the messages relating to each sub-topic. In particular, the present invention recognizes that conventional Chat facilities lack means for easily directing a message towards a particular sub-topic and for effectively presenting messages according to the pertinent sub-topic.

SUMMARY OF THE INVENTION

To address these shortcomings, the present invention introduces a method, system, and program product capable of receiving first and second messages and respectively associated first and second sub-topic identifiers from a discussion forum, displaying each message associated with the first sub-topic identifier in a message window using a first presentation format, and displaying each message associated with the second sub-topic identifier in the message window using a second presentation format.

In an illustrative embodiment, each message associated with the first sub-topic identifier is displayed in a first column in the message window and each message associated with the second sub-topic identifier is displayed in a second column in the message window.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
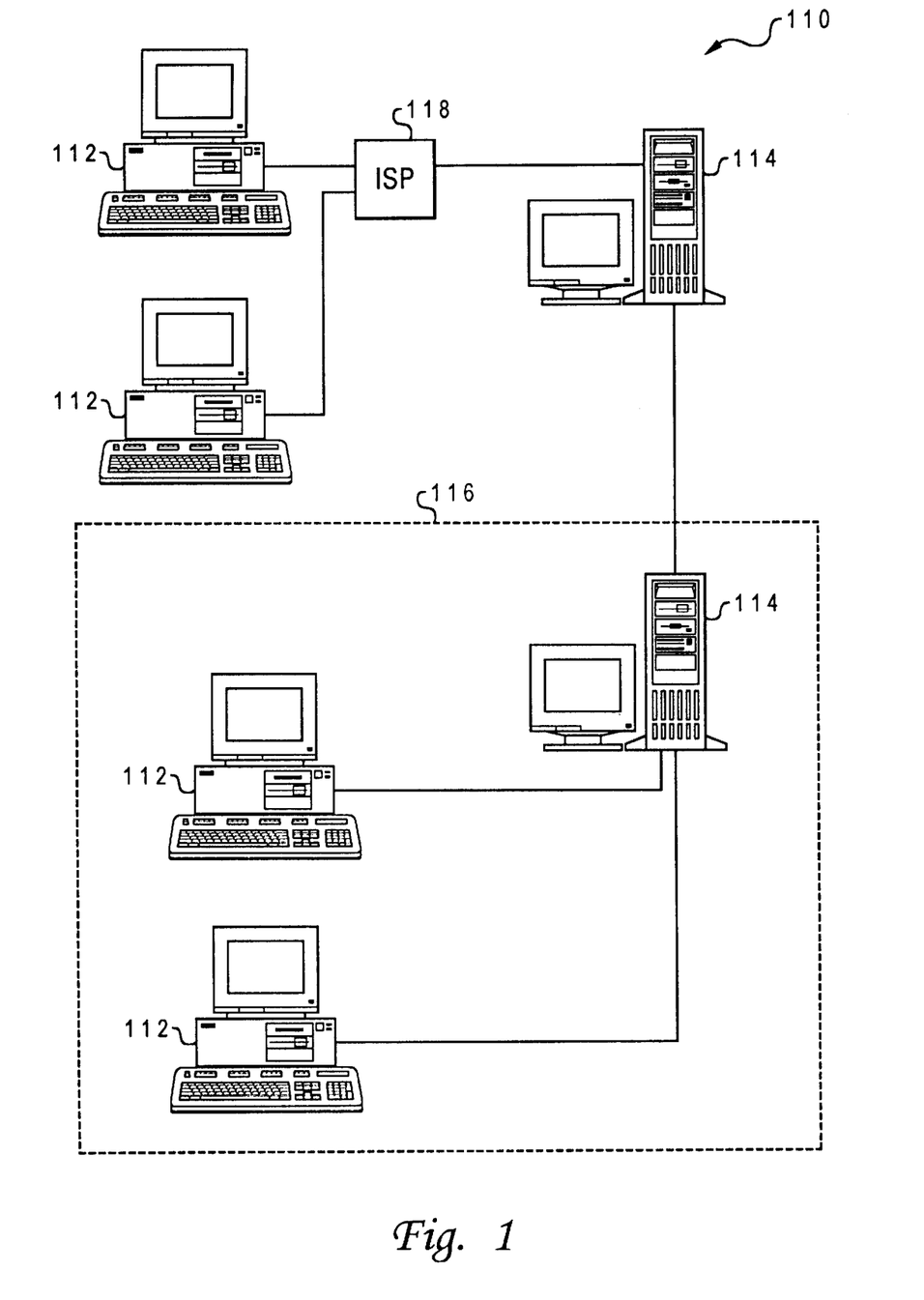
FIG. 1 depicts a block diagram of an illustrative embodiment of a data processing system with facilities for managing operator intercommunication according to the present invention.

The present invention is directed to facilitating communication in any environment having two or more workstations in mutual communication, including environments such as local area networks (LANs), wide area networks (WANs), and public data networks such as the Internet, and is not limited to any particular network protocol. With reference now to the figures and in particular with reference to FIG. 1, there is depicted an exemplary collaborative data processing environment 110 in accordance with the present invention that includes four workstations 112 and two Chat servers 114. Each workstation 112 is connected to one Chat server 114, either directly within a LAN 116 or indirectly through an Internet Service Provider (ISP) 118. Also, Chat servers 114 are in communication with each other. Consequently, each workstation 112 is indirectly coupled to each other workstation 112. Although the present invention could also be used with multi-user systems wherein one or more of workstations 112 are dumb or smart terminals connected to a central processing system, each workstation 112 in the illustrative embodiment is a single-user data processing system.

Figure 2:
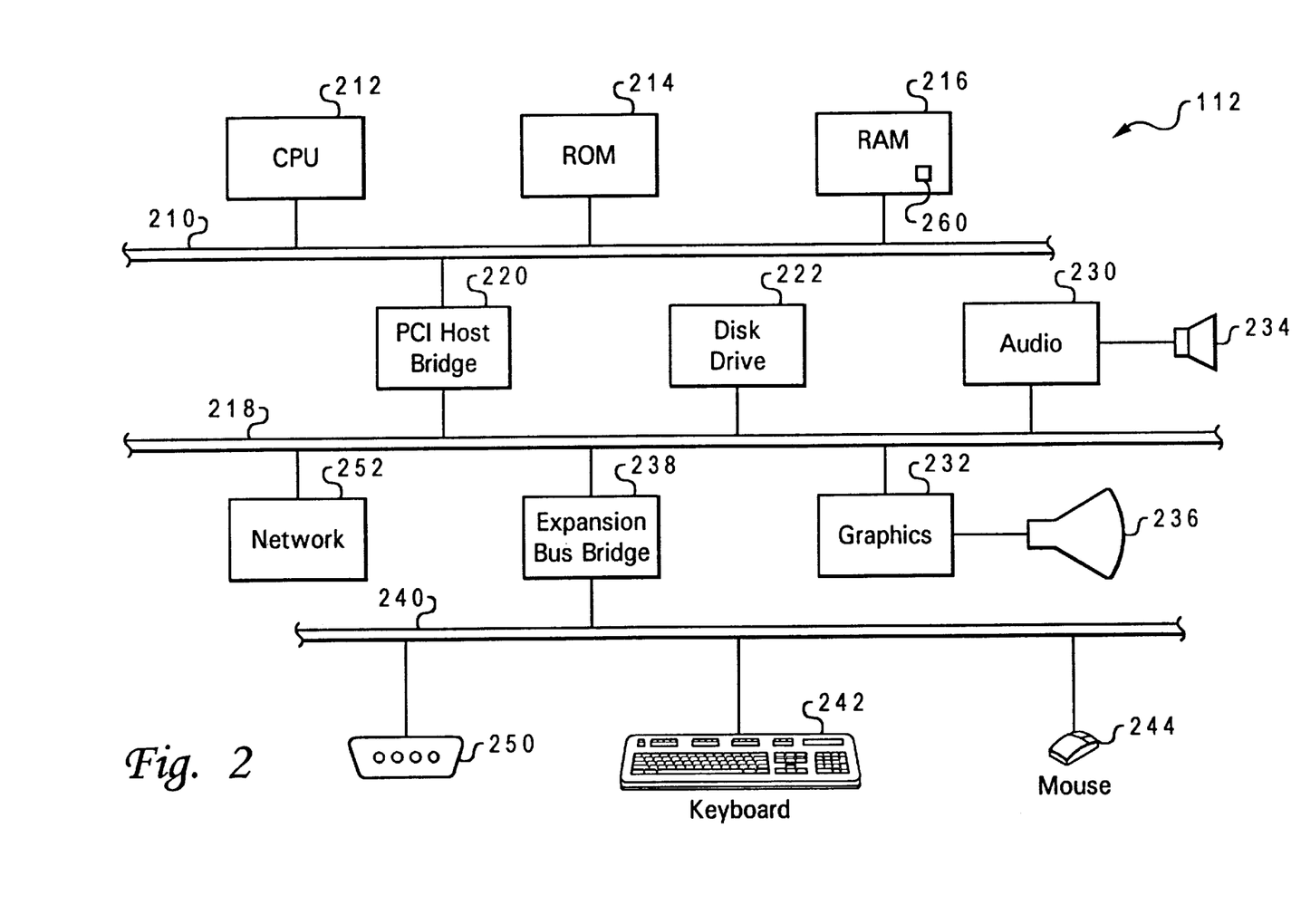
FIG. 2 is a layer diagram of the programs in the data processing system of FIG. 1 that cooperate to manage operator intercommunication according to the present invention.

Referring now to FIG. 2, there is illustrated a more detailed block diagram of an illustrative embodiment of a workstation 112. As shown, each workstation 112, which may comprise a personal computer, for example, includes a system bus 210 that is connected to a central processing unit (CPU) 212 and to memory, including read only memory (ROM) 214 and random access memory (RAM) 216. CPU 212 and the memory are also coupled to a PCI local bus 218 of workstation 112 through a PCI host bridge 220. PCI local bus 218 is also connected to additional nonvolatile data storage devices, such as one or more disc drives 222, and to an audio adapter 230 and a graphics adapter 232 for controlling audio output through a speaker 234 and visual output through a display device 236, respectively. A PCI-to-ISA bus bridge, such as expansion bus bridge 238, connects PCI local bus 218 to an ISA bus 240, which is attached (through appropriate adapters) to a keyboard 242 and a mouse 244 for receiving operator input.

Workstation 112 also includes a data port for communicating with other constituents of collaborative data processing environment 110. The data port may be a serial port 250 attached to ISA bus 240 for linking workstation 112 to ISP 118 via a modem (not illustrated) or a communications adapter 252 attached to PCI bus 218 for connecting workstation 112 to LAN 116, or both serial port 250 and communications adapter 252.

Each workstation 112 also includes software programs that are stored on the data storage devices or retrieved from other parts of collaborative data processing system 110 and loaded into RAM 216 and then into CPU 212 for execution. Among those programs is an intercommunication manager (Chat client program) 260 for receiving messages from and transmitting messages to other workstations 112 within collaborative data processing environment 110.

Figure 3:
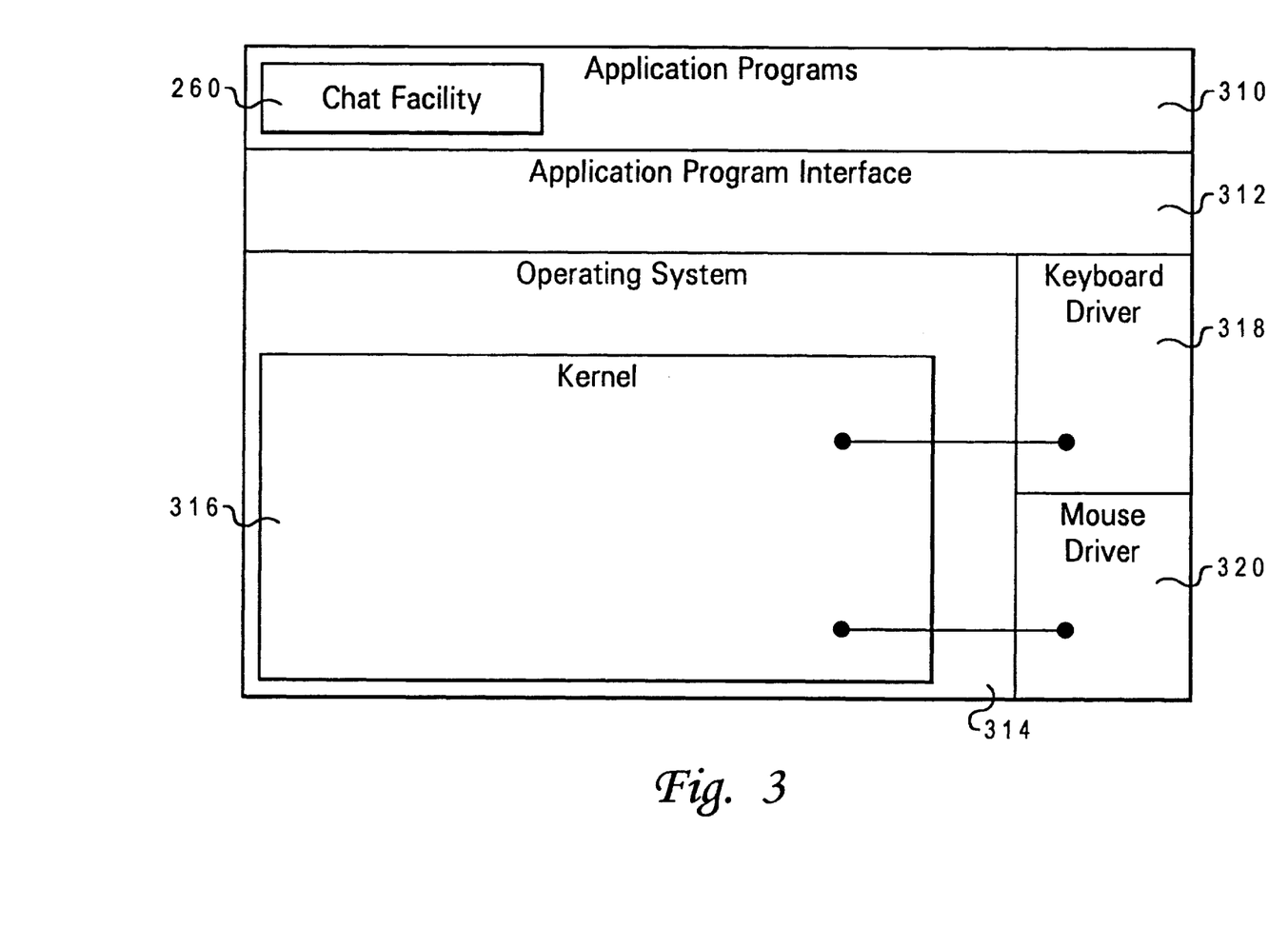
FIG. 3 illustrates an exemplary collaborative data processing environment including facilities for managing operator intercommunication according to the present invention.

Referring now to FIG. 3, there is depicted a layer diagram of the software within a typical workstation 112 that is executed to provide the functionality of the present invention. At the highest level of the diagram are the application programs 310, including Chat client program 260. Chat client program 260 provides communications functions, as well as a graphical user interface (GUI) for facilitating entry of messages by the operator of workstation 112 and for displaying messages received from Chat server 114.

At the intermediate level is an application program interface (API) 312 through which application programs 310 request services from the operating system 314. Operating system 314, which occupies the lowest level of the diagram, manages workstation operations by performing duties such as resource allocation, task management, and error detection. Included in operating system 314 is a kernel 316 that manages the memory, files, and peripheral devices of workstation 112. The lowest level also includes device drivers, such as keyboard driver 318 and mouse driver 320, that kernel 316 utilizes to manage input from and output to peripheral devices.

In the illustrative embodiment, workstations 112 and Chat servers 114 are networked using a client/server architecture (such as that utilized by the Internet) in which client workstations 112 handle direct user interaction and Chat servers 114 handle centralized functions such as data management, security, and information sharing. Chat servers 114 provide a discussion forum within collaborative data processing environment 110 through the execution of a Chat server program that performs tasks such as accepting requests for registration from operators at workstations 112, maintaining lists that identify the participants and their respective workstations 112, receiving messages posted from workstations 112, and forwarding such messages to some or all participants.

The operational context of the illustrative embodiment comprises a meeting involving four employees of a manufacturing company which each participate in the meeting through one of workstations 112. The main topic of the meeting is the development of Product X, and the employees will make comments that relate to various conversation threads or sub-topics, such as marketing and budgeting. As messages are posted to the discussion forum, each workstation 112 will record and display a discussion history comprising those messages. The illustrative embodiment describes an exemplary implementation of the novel features of the present invention, including features that enable the meeting's participants to direct comments toward particular sub-topics, to view comments according to sub-topic, and to reassign comments from one sub-topic to another.

Before each meeting begins, an administrator utilizes the Chat server program to configure Chat servers 114 for that meeting, for example by entering a title for the predetermined main topic and by entering forum usage restrictions. Those restrictions may include an exclusive list of authorized participants. Those restrictions may also include a permissions list identifying the participants that will be allowed to create new sub-topics or to reassign comments from one sub-topic to another, or both. For instance, the ability to reassign messages may be granted only to a predetermined meeting leader, or that ability may be granted only to the person who sent the message or to both the meeting leader and the message sender. Alternatively, the administrator may leave participation, sub-topic creation, and reassignment unrestricted.

After servers 114 have been configured to provide the desired forum, each employee of the manufacturing company who will be participating in the discussion invokes execution of Chat client program 260 at one of workstations 112 and then utilizes that program to register with one of Chat servers 114 and to send messages to and receive messages from the workstations 112 of the other participants.

Figure 4:
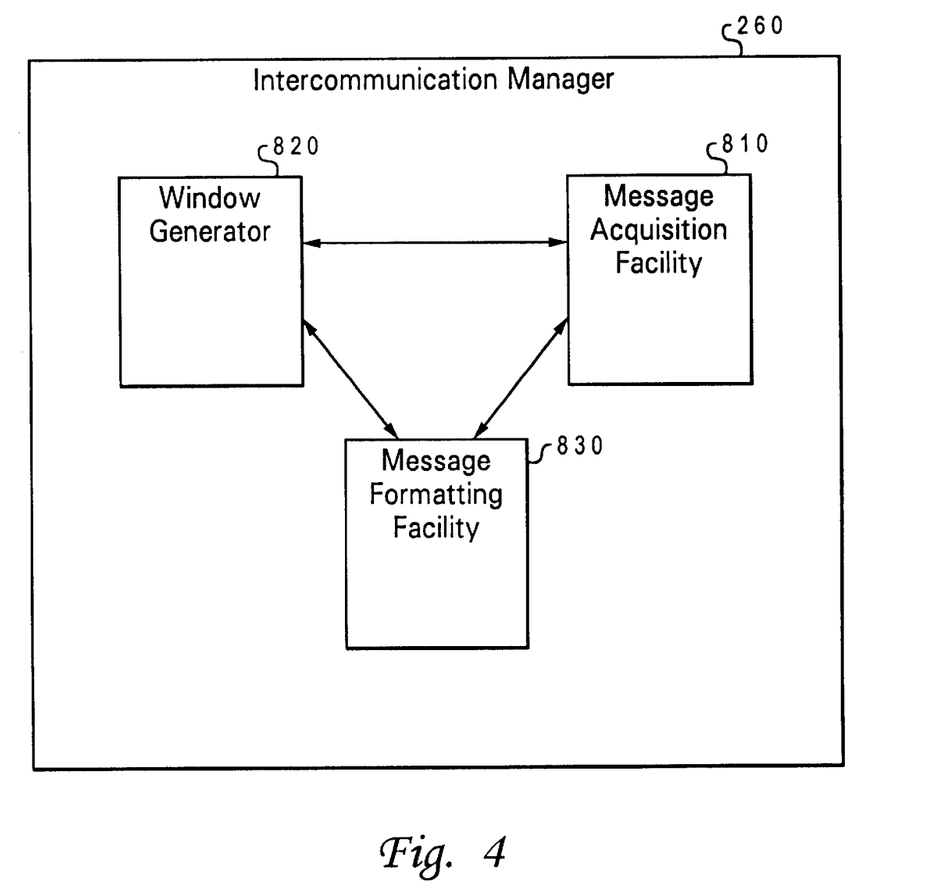
FIG. 4 is a block diagram of the main components of an exemplary Chat client program according to the present invention.

With reference now to FIG. 4, there is depicted a block diagram of the three main components of an exemplary implementation of Chat client program 260 according to the present invention. One component is a message acquisition facility 810 that receives messages and associated sub-topic identifiers from the discussion forum. Another component is a window generator 820 that provides a visual framework for user interaction. A third component is a message formatting facility 830 that displays received messages within the visual framework in presentation formats that differ according to sub-topic. As shown, each of the main components may send information to and receive information from each of the other components.

Figure 5:
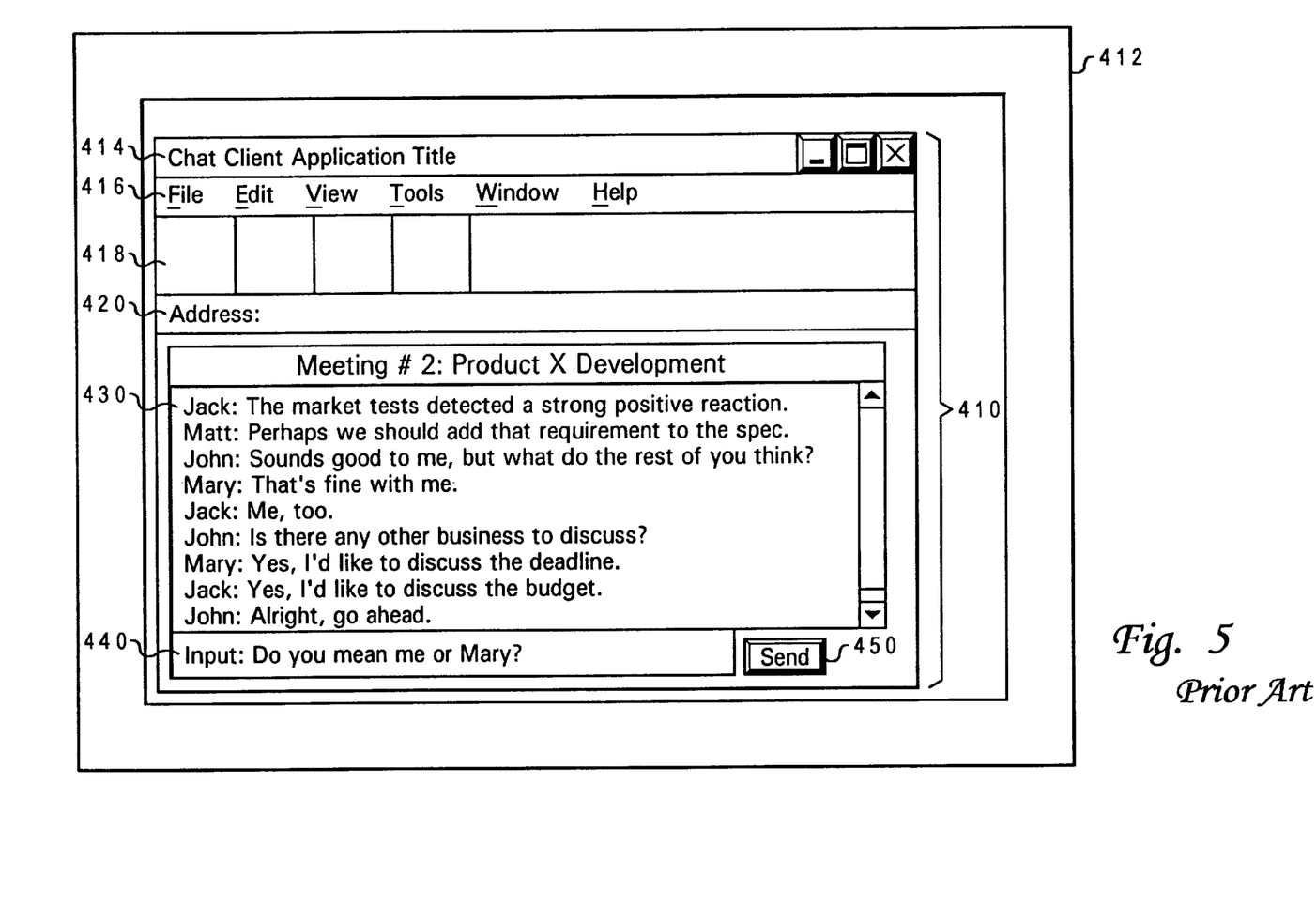
FIG. 5 illustrates a user interface of a conventional system for managing operator intercommunication in a collaborative data processing environment.

Referring now to FIG. 5, there is depicted the GUI of a typical conventional Chat client program showing a main application window 410 displayed within a display device 412 of a workstation. Main application window 410 includes a title bar 414, a menu bar 416, a toolbar 418, and an address bar 420. Main application window 410 also includes a message window 430 for displaying the messages that have been posted to the discussion forum, an input field 440 for displaying messages' as they are being entered by the operator of the workstation to which display device 412 is attached, and a "send" button 450 that may be utilized to post the entered message to the discussion forum.

As shown, a typical conventional Chat client program displays posted messages in message window 430 in a single column, prefacing the text of each message with the userid, name, or nickname of the sender and inserting each newly received message immediately below the previously received message. However, when the discussion involves multiple sub-topics of the main topic, such a presentation format can lead to confusion. For example the presentation format illustrated in FIG. 5 does not clearly indicate whether John was responding to Mary or to Jack when he posted the message "All right, go ahead."

By contrast, Chat client program 260 according to the present invention provides a GUI that clearly differentiates messages according to sub-topic. Towards that end, the present invention provides facilities for associating an entered message with a particular sub-topic before that message is posted to the forum, and the present invention causes the received messages that are associated with different sub-topics to be displayed using different presentation formats, such as different fonts, colors, columns, or a combination of those formats.

Figure 6:
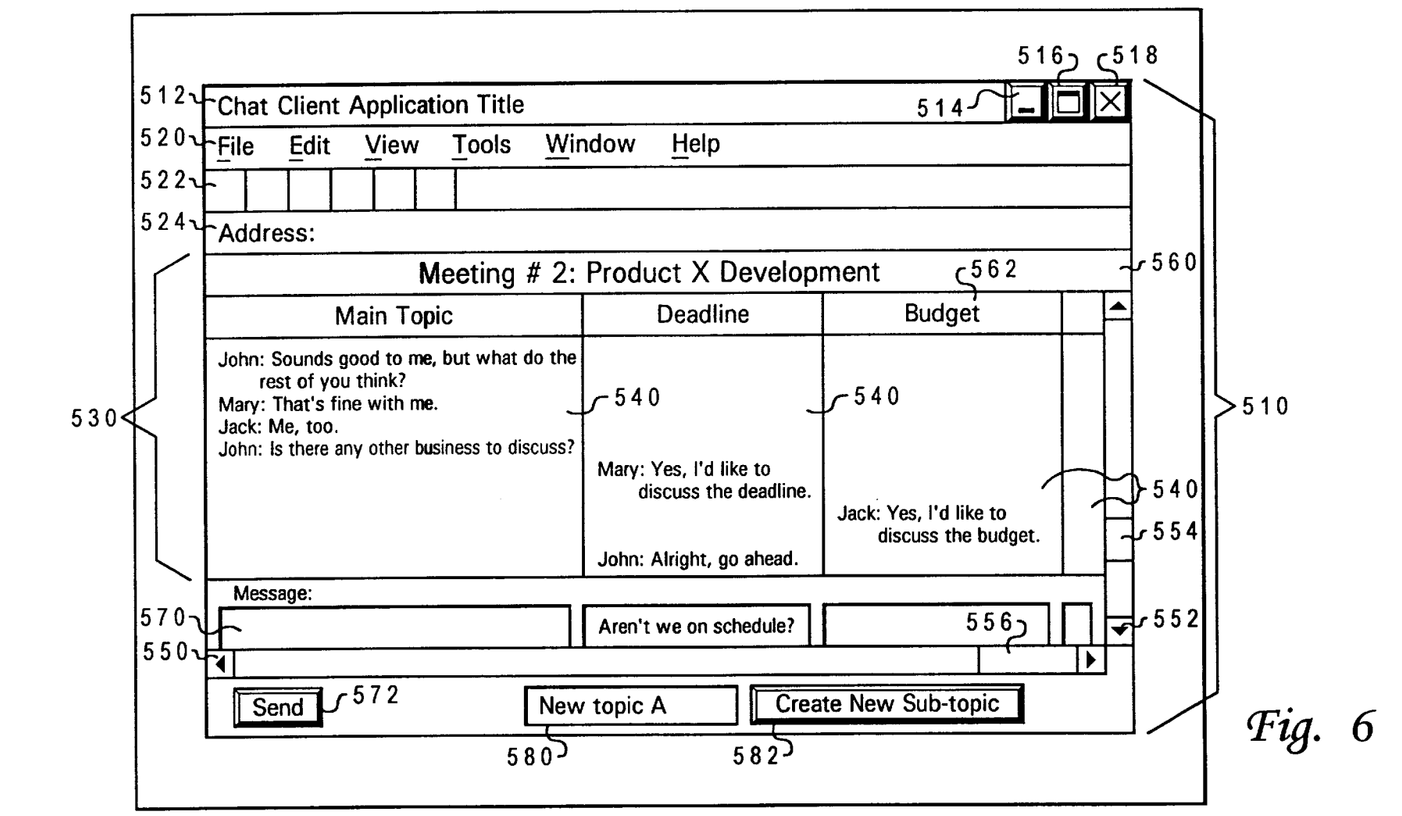
FIGS. 6 and 7 depict alternative illustrative user interfaces for managing operator intercommunication in accordance with the present invention.

As shown in FIG. 6, a first implementation of the present invention provides a GUI with a main application window 510 that includes a title bar 512 with a minimize button 514, a maximize button 516, and a close (or destroy) application button 518; a menu bar 520; a toolbar 522; and an address bar 524. A message window 530 is also displayed within main application window 510. Unlike conventional message window 430, however, message window 530 is divided into columns 540 that correspond to discussion sub-topics, and each received message is displayed in the column 540 that corresponds to the sub-topic with which that message is associated. The messages.are displayed in chronological order with older messages displayed above newer ones. A horizontal scroll bar 550 and a vertical scroll bar 552 are provided to allow the operator to view a desired portion of the received messages. For instance, the operator may move the vertical scroll box 554 upwards to view messages that were automatically scrolled beyond the top of message window 530 to make room for newer messages. Likewise, the operator may slide the horizontal scroll box 556 towards the left to view messages in topic columns that were automatically scrolled beyond the left edge of message window 530 to make room for new topic columns. Chat client program 260 also provides functions with which the operator of a workstation 112 may change the layout of message window 530 within that individual workstation 112, including facilities for altering the width of one or more columns 540 and for rearranging one or more columns 540.

Figure 7:
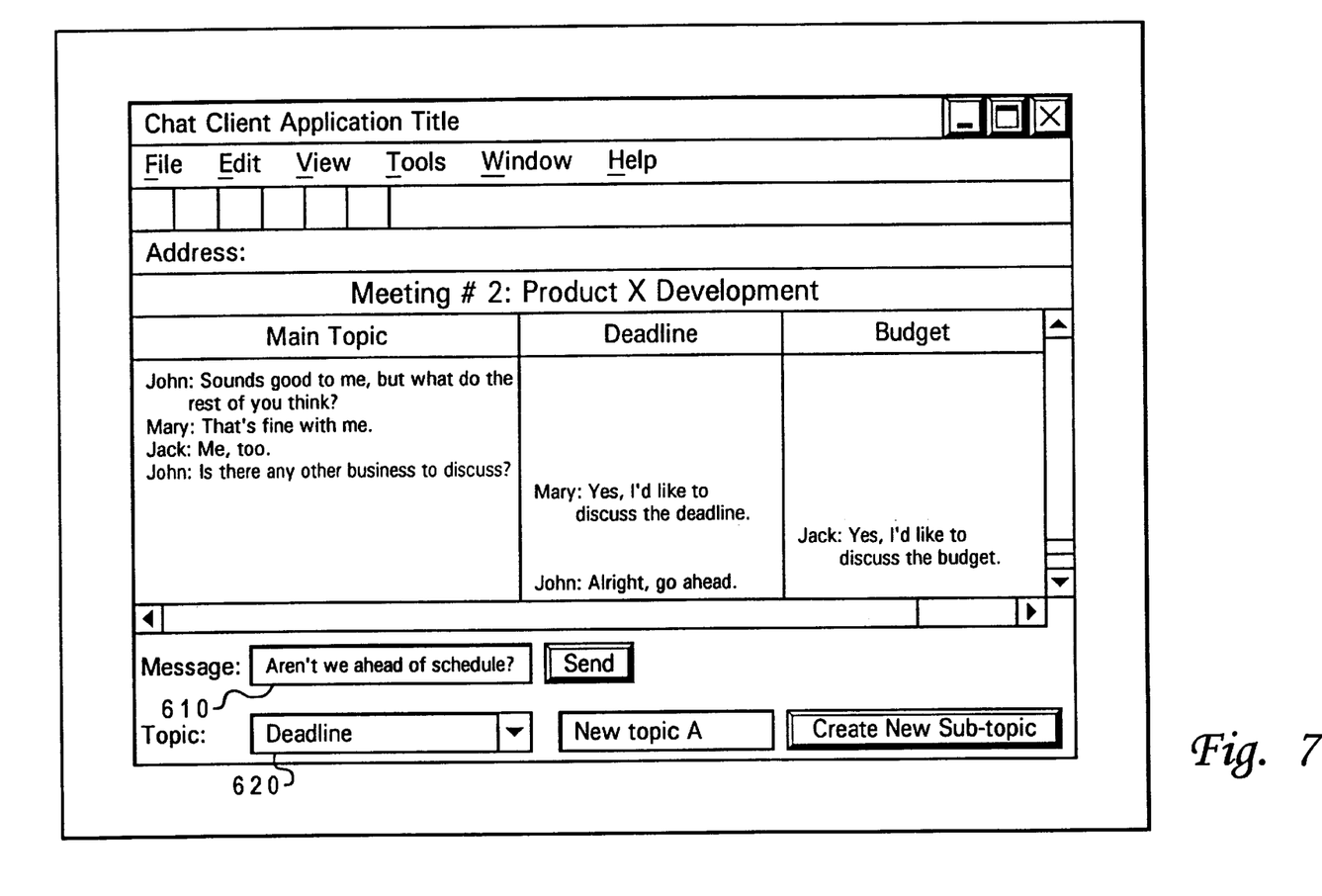

A main topic title 560 is displayed at the top of message window 530, and a sub-topic title 562 is displayed at the top of each column 540. Main application window 510 also provides at least one message input field 570 and a "send" button 572 for entering new messages, associating those messages with sub-topics, and posting those messages to the forum. In a first s implementation, a separate message input field 570 is displayed for each column 540, and messages are automatically associated with the sub-topics of their respective columns 540. As illustrated in FIG. 7, a second implementation of the present invention provides a single message input field 610, and each entered message is either associated with a default sub-topic or associated with a particular sub-topic by means of a selection list such as a list box 620. Main application window 510 also provides a sub-topic input field 580 and a sub-topic creation button 582 for creating new subtopics with operator-specified titles.

As each workstation receives messages associated with new sub-topics, Chat client program 260 displays those new messages in new columns 540 that are added to message window 530 from the right, and the currently displayed columns 540 are automatically scrolled to the left to make room or the new column 540, if necessary. Furthermore, when any workstation 112 receives a message associated with a column that has been scrolled out of message window 530 (i.e., a non-displayed column), Chat client program 260 automatically brings the non-displayed column into view by swapping the non-displayed column with the least active displayed column, (i.e., the displayed column having a most-recently received message that is older than the most-recently received messages in all of the other displayed columns).

In addition, Chat client program 260 provides chronological and compressed presentation modes, which an operator may select between utilizing menu bar 520 or toolbar 522. In both modes, each new message is presented just below the previously received messages that are associated with the same sub-topic. In the chronological presentation mode, whenever it is necessary to make room at the bottom of any column 540 to display a newly received message, the messages in all columns 540 are shifted the same distance. Accordingly, only one message is displayed in each row, and message chronology is maintained across all columns 540, as in a Gantt chart.

By contrast, in the compressed presentation mode, whenever it is necessary to make room for a message in one column 540, only the messages in that column 540 are shifted. Accordingly, each row may contain more than one message, and, even though the messages within a particular column 540 are maintained in chronological order, the positions of messages in different columns 540 may not correspond to the chronology of those messages.

When Chat client program 260 sends a message to the forum, for example in response to an operator utilizing keyboard 242 to enter text into message input field 570 and utilizing mouse 244 to select send button 572, Chat client program 260 sends that message to Chat server 114 in the form of a message post. A message post comprises the entered text, together with control codes that identify the post as a message post and specify how the message should be processed. For example, the control codes may include a source code that identify the sender of the message, a routing address (such as an Internet Protocol (IP) address), and a discussion forum identifier for directing the post to the correct Chat server 114. In addition, since entered message are associated with sub-topics, the control codes also include a sub-topic identifier.

According to an exemplary implementation of the present invention, in addition to new message posts, Chat client program 260 produces new sub-topic posts, message reassignment posts, and column consolidation posts in response to operator input, as described in greater detail below. Each of those types of posts also includes a control code identifying the post type. In addition, new sub-topic posts include the identifier for the new sub-topic, message reassignment posts include a list specifying the sender and the time-stamp of each message to be reassigned to a new sub-topic, and column consolidation posts include a list identifying the sub-topics of the two columns that will be merged into a single column.

When Chat server 114 receives any post, Chat server 114 adds to that post a time-stamp control code indicating when the post was received. Chat server 114 then forwards the post to each registered participant. As workstations 112 receive such posts, Chat client program 260 alters the GUI on each respective display device 236 accordingly, as described above and below.

Figure 8A:
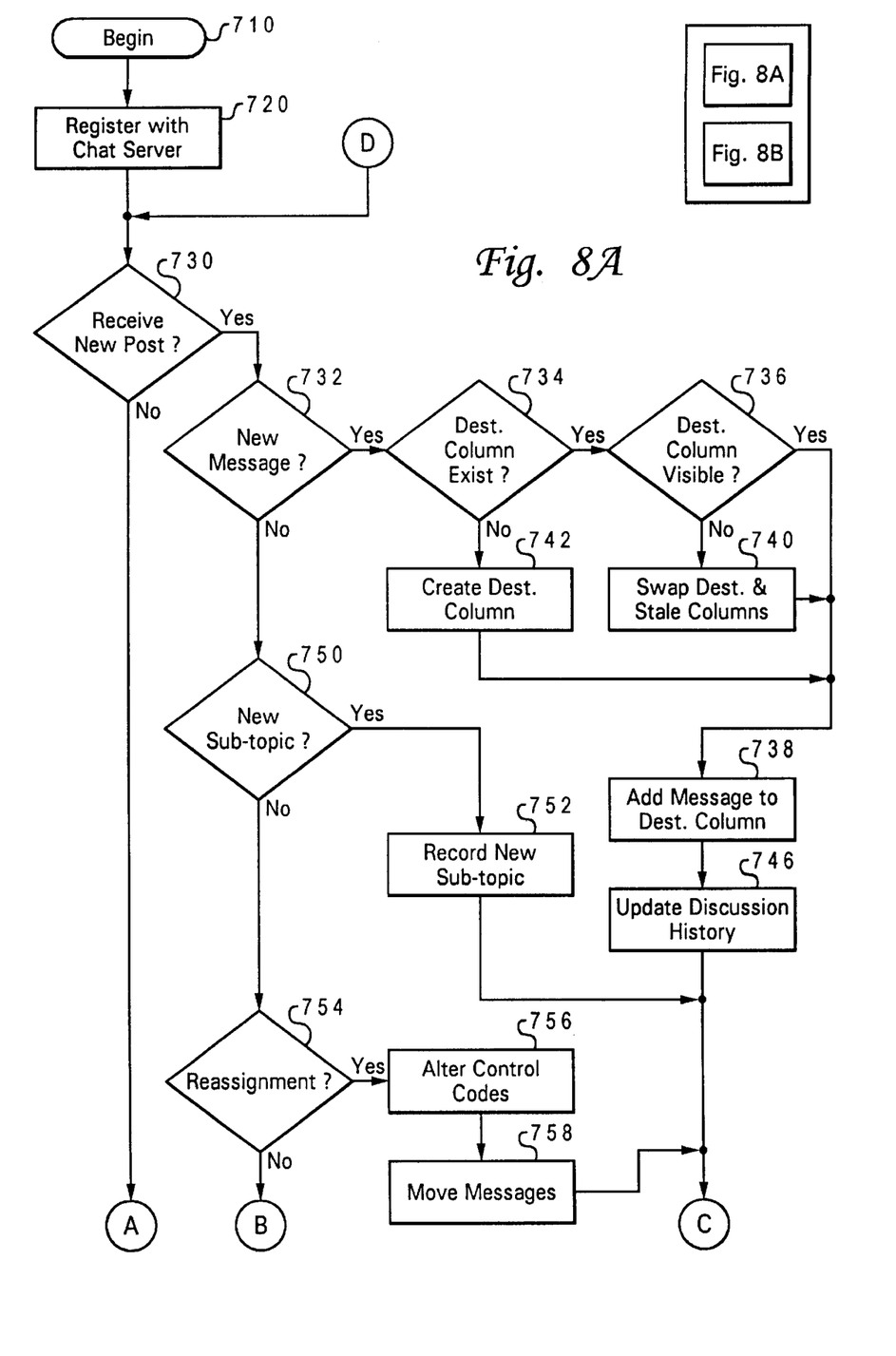
FIGS. 8A and 8B together form a high level logical flowchart depicting an exemplary process for managing operator intercommunication in accordance with the present invention.
Figure 8B:
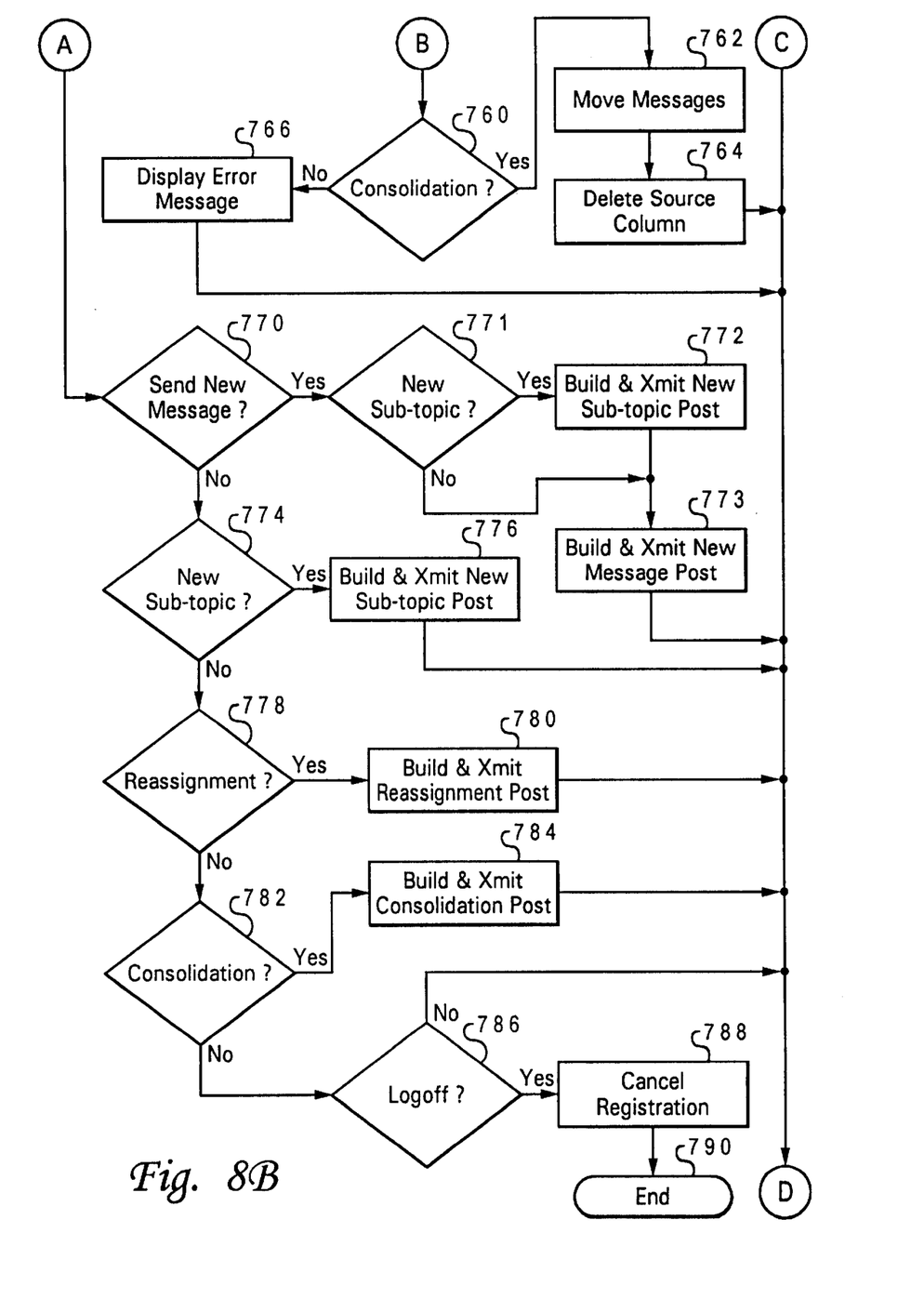

Referring now to FIGS. 8A and 8B, there is depicted a high level logical flowchart of an illustrative embodiment of a method for managing operator intercommunication in a collaborative data processing environment. The operations depicted in FIGS. 8A and 8B can be implemented by software, hardware, firmware, or a combination of these residing in any one or more components of the collaborative data processing environment. For illustrative purposes, the process shown in FIGS. 8A and 8B will be described in terms of collaborative data processing environment 110, although the features of the present invention are not limited to that particular environment's hardware and software configuration.

The process begins at block 710 with an operator stationed at a workstation 112 executing Chat client program 260. As shown at block 720, the operator then registers as a participant in a particular discussion forum by sending to a Chat server 114 a request that identifies the operator, the workstation 112, and the forum.

The process continues with Chat client program 260 entering an input loop containing a number of branches for processing input received from the operator and posts received from the forum. Within the input loop a determination is made whether a new post has been received from the forum (i.e., via the Chat server 114 with which workstation 112 is registered), as shown at block 730. If a post has not been received, the process passes through page connector A to block 770 of FIG. 8B, which is described below.

If a post has been received, Chat client program 260 examines the control codes of the post to determine whether the post contains a message (i.e., a textual comment entered by one of the forum's participants), as illustrated at block 732. As depicted at block 734, if the post contains a message, Chat client program 260 determines whether a column that is associated with the same sub-topic as the message (i.e., a destination column) exists yet. If the destination column already exists, Chat client program 260 then determines whether that column is currently visible in the display window, as shown at block 736. If the destination column is visible, Chat client program 260 then simply adds the userid, name, or nickname of the sender and the text of the message to that column, as depicted at block 738.

If the destination column is not currently visible, Chat client program 260 determines which visible column is the most stale, as described above, and then swaps the destination column and the most stale column, as shown at block 740, before adding the message and sender's userid to the destination column, as depicted at block 738.

If the post contains a message but a corresponding destination column does not exist, Chat client program 260 creates a destination column within the message window, shifting visible columns to the left if necessary to make room for the destination column, as shown at block 742, before adding the message and the sender's userid to the destination column, as depicted at block 738. Alternatively, as illustrated in FIG. 5, Chat client program 260 may be configured to maintain an unused topic column to the right of all other topic columns to facilitate the rapid entry of a message to be associated with a new default sub-topic. When so configured, Chat client program 260 responds to the receipt of a message that has no corresponding destination column by inserting a destination column between the unused topic column and the other columns before adding the message and the sender's userid to the destination column. In either configuration the destination column includes, as a sub-topic title, a default or an operator-specified sub-topic label.

As shown at block 746, after the message has been displayed, the message, its sender identifier, and its timestamp are stored in the discussion history for workstation 112, and the process then returns through page connectors C and D to the beginning of the input loop at block 730.

Referring again to block 732, if the post received by workstation 112 does not contain a message, the process passes to block 750. As shown at block 750, Chat client program 260 then determines whether the post contains a new sub-topic. If it does, the new sub-topic identifier and label are stored at workstation 112, as depicted at block 752. One embodiment of the present invention then causes a new column to be displayed with the new sub-topic label as the column's title. However, a preferred embodiment does not display the new column until a message that is associated with the new sub-topic is received. In either embodiment, the process then returns through page connectors C and D to the beginning of the input loop at block 730.

With reference again to block 750, if the control codes indicate that the post does not contain a new sub-topic, the process passes to block 754, which depicts a determination whether the post is a reassignment post. Such posts are generated when a participant reassigns one or more messages from one sub-topic to another, for instance by utilizing mouse 244 to select one or more messages from one column 540 and then reassigning the selected message(s) to a second column 540 utilizing the conventional drag-and-drop technique. If the post is a reassignment post, the sender and time-stamp information for the posts to be reassigned are extracted from the reassignment post, the posts to be reassigned are located in the discussion history for workstation 112, and the control codes of those posts are then updated with the new sub-topic indicated by the reassignment post, as illustrated at block 756. Then, as shown at block 758, if the columns displayed in message window 530 include any of the messages to be reassigned, or should include such messages after the reassignment is complete, message window 530 is updated to display the reassigned messages in the column associated with the new sub-topic and not in the columns from which the message were reassigned. Furthermore, the reassigned messages are automatically inserted among the messages of the column 540 of the second sub-topic in positions that maintain that column's chronological order. The process then returns to the beginning of the input loop at block 730.

Referring again to block 754, if the post is not a reassignment post, the process proceeds through page connector B to block 760, which illustrates a determination whether the post is a consolidation post. Consolidation posts are generated when a participant utilizes the column consolidation function of the present invention to merge-two columns into one, as might be desired to reduce the amount of horizontal scrolling required to view older messages. An exemplary implementation of such functionality allows an operator to select an entire column of messages by right-clicking on the sub-topic title 562 for that column, selecting a "cut column" function from the resulting menu of s available functions, right-clicking on the sub-topic title 562 of a destination column, and then selecting a "pastel" function from the resulting menu.

If the received post is a consolidation post, all of the messages associated with the source column are added to the destination column, as depicted at block 762. When moving messages to the destination column, Chat client program 260 automatically maintains the messages in chronological order and displays the moved messages in a font and/or color that differs from the font and/or color utilized to display the messages originally displayed in the destination column. A visual differentiation between the moved messages and the original messages is thereby maintained. As shown at block 764, the source column is then deleted, and, if the source or destination column is visible in message window 530, message window 530 is updated in accordance with the new column and message arrangement. The process then returns to block 730 through page connector D.

However, if a determination is made at block 760 that the received post is not a consolidation post, an error message is displayed at workstation 112, as shown at block 766, and the process then returns to block 730.

If a determination is made at block 730 that workstation 112 has not received a post from the forum, the process passes to block 770, which depicts a determination whether the operator has requested the posting of a new message. If the operator has entered such a request, Chat client program 260 then determines whether the operator associated the new message with a new sub-topic, for example by entering the new message in the message input field 570 below the unused, rightmost sub-topic column 540, as depicted at block 771. As shown at block 772, if the new message is associated with a new sub-topic, a new sub-topic post including a new sub-topic identifier and a default label (such as "Topic A," "Topic B," or all or part of the text of the new message) is automatically built and transmitted to Chat server 114. After the determination depicted at block 771, whether the new message is associated with a new sub-topic or not, Chat client program 260 builds a message post, as described above, and transmits that message post to Chat server 114, as shown at block 773. The process then returns to block 730.

As illustrated at block 774, if the operator has not requested the posting of a new message, a determination is made whether the operator has requested the posting of a new sub-topic, in which case the process passes to block 776. As shown at block 776, Chat client program 260 responds to such a request by building a new sub-topic post, as described previously, and transmitting that post to Chat server 114. The process then returns to block 730.

As depicted at block 778, if the operator has not requested the posting of a new sub-topic, it is determined whether the operator has requested the posting of a reassignment post. If a reassignment post has been requested, the process passes to block 780, which illustrates Chat client program 260 building a reassignment post, as described above, and transmitting that reassignment post to Chat server 114. The process then returns to block 730.

If the operator has not requested the posting of a reassignment post, a determination is made at block 782 whether the operator has requested the posting of a consolidation post. If so, the process passes to block 10 784, which depicts Chat client program 260 building a consolidation post, as described previously, and transmitting that consolidation post to Chat server 114. The process then returns to block 730.

As shown at block 786, if the posting of a consolidation post was not requested, a determination is made whether the operator has requested a termination of his or her participation in the discussion forum, for instance by selecting a logoff button on toolbar 522. If termination of participation has not been requested, the process returns to the beginning of the input loop, depicted at block 730, where a determination is made whether a post has been received since the last time the input loop was initiated or resumed.

If termination has been requested, Chat client program 260 notifies Chat server 114 that the operator should be removed from the list of participants, as shown at block 788. The process then terminates at block 790.

As has been described, the present invention provides an improved Chat interface that facilitates discussions involving separate sub-topics. The present invention introduces many features of importance to participants in such discussions, including convenient means for associating comments with particular sub-topics, a visual presentation that clearly distinguishes comments according to sub-topic, and facilities for creating, destroying, and combining sub-topics.

While the invention has been particularly shown and described with reference to an illustrative embodiment, it will be understood by those skilled in the art that various changes in form and detail may be made therein without departing from the spirit and scope of the invention. For example, although the illustrative embodiment describes Chat client program 260 as the primary source of many of the inventive functions, those functions could alternatively be provided by, or in greater cooperation with, other programs, such as the Chat server program.

Furthermore, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for managing operator intercommunication in a collaborative data processing environment, said method comprising:

displaying a message window for a discussion forum in a display device of a workstation of a participant in said discussion forum, said discussion forum having a plurality of participants at respective workstations, each participant having access to all messages of said discussion forum;

receiving first and second messages and respectively associated first and second sub-topic identifiers from said discussion forum;

displaying each message associated with said first sub-topic identifier within said message window utilizing a first presentation format; and displaying each message associated with said second sub-topic identifier within said message window utilizing a second presentation format.

2. A method for managing operator intercommunication in a collaborative data processing environment, said method comprising:

displaying a message window in a display device of a workstation;

receiving first and second messages and respectively associated first and second sub-topic identifiers from a discussion forum;

displaying each message associated with said first sub-topic identifier within said message window utilizing a first presentation format, wherein said step of displaying each message associated with said first sub-topic identifier comprises displaying each such message in a first column within said message window; and displaying each message associated with said second sub-topic identifier within said message window utilizing a second presentation format, wherein said step of displaying each message associated with said second sub-topic identifier comprises displaying each such message in a second column within said message window.

3. The method according to claim 2 further comprising: automatically scrolling said first column horizontally in response to receipt of said second message.

4. The method according to claim 2 further comprising:
receiving a third message and an associated third sub-topic identifier from said discussion forum;
assigning each message associated with said third sub-topic identifier to a third column;
automatically ascertaining which column among said first and second columns was a least recently updated column; and
automatically displaying said third column within said message window in lieu of said least recently updated column.

5. The method according to claim 2, wherein, when a compressed presentation mode is active, messages within said first column are maintained in relative vertical positions that indicate a relative chronology of said messages within said first column.

6. The method according to claim 5, wherein, when a chronological presentation mode is active, said first and second messages in said first and second columns are maintained in relative vertical positions that indicate a relative chronology of said first and second messages.

7. The method according to claim 2, wherein said workstation is a first workstation, said display device is a first display device, and said message window is a first message window, said method further comprising:
displaying a second message window in a second display device of a second workstation; and
in response to operator input requesting consolidation of said first and second columns, displaying said first and second messages in a single column within each of said first and second message windows, wherein vertical positions of said first and second messages indicate a relative chronology of said first and second messages.

8. The method according to claim 1 further comprising:
creating a new sub-topic identifier having an associated new presentation format in response to operator input;
automatically associating a default label with said new sub-topic identifier; and
displaying said default label in said display device utilizing said new presentation format.

9. The method according to claim 1 further comprising:
creating a new sub-topic identifier having an associated new presentation format in response to operator input;
associating an operator-specified label with said new sub-topic identifier; and
displaying said operator-specified label in said display device utilizing said new presentation format.

10. The method according to claim 1, wherein said workstation is a first workstation, said display device is a first display device, and said message window is a first message window, said method further comprising:
displaying said first and second messages utilizing said first and second presentation formats, respectively, within a second message window in a second display device of a second workstation; and
in response to operator input that associates said first message with said second sub-topic identifier in lieu of said first sub-topic identifier, displaying said first message utilizing said second presentation format in lieu of said first presentation format within each of said first and second message windows.

11. The method according to claim 10, wherein:
said steps of displaying each message associated with said first sub-topic identifier in said first and second message windows comprise displaying each such message in a first column within said first and second message windows;
said steps of displaying each message associated with said second sub-topic identifier in said first and second message windows comprise displaying each such message in a second column within said first and second message windows; and
said step of altering said first and second message windows comprises displaying said first message in said second column in lieu of said first column in a vertical position that indicates a relative chronology of said first and second messages.

12. A program product for managing operator intercommunication in a collaborative data processing environment, said program product comprising:
a window generator that displays a message window for a discussion forum in a display device of a workstation of a participant in said discussion forum, said discussion forum having a plurality of participants at respective workstations, each participant having access to all messages of said discussion forum;
a message acquisition facility that receives first and second messages and respectively associated first and second sub-topic identifiers from said discussion forum;
a message formatting facility that displays each message associated with said first sub-topic identifier within said message window utilizing a first presentation format and that displays each message associated with said second sub-topic identifier within said message window utilizing a second presentation format; and
a computer usable medium encoding said window generator, said message acquisition facility, and said message formatting facility.

13. A program product for managing operator intercommunication in a collaborative data processing environment, said program product comprising:
a window generator that displays a message window in a display device of a workstation;
a message acquisition facility that receives first and second messages and respectively associated first and second sub-topic identifiers from a discussion forum;
a message formatting facility that displays each message associated with said first sub-topic identifier within said message window utilizing a first presentation format and that displays each message associated with said second sub-topic identifier within said message window utilizing a second presentation format, wherein said message formatting facility displays each message associated with said first sub-topic identifier in a first column within said message window and each message associated with said second sub-topic identifier in a second column within said message window; and
a computer usable medium encoding said window generator, said message acquisition facility, and said message formatting facility.

14. The program product according to claim 13, wherein said message formatting facility automatically scrolls said first column horizontally in response to receipt of said second message.

15. The program product according to claim 13, wherein:
said message acquisition facility includes means for receiving a third message and an associated third sub-topic identifier from said discussion forum; and
said message formatting facility includes:
means for assigning each message associated with said third sub-topic identifier to a third column;
a column-age evaluator that automatically ascertains which column among said first column and said second column was a least recently updated column; and
an automatic column exchanger that automatically causes said third column to be displayed within said message window in lieu of said least recently updated column.

16. The program product according to claim 13, wherein said message formatting facility includes a compressed presentation mode which causes said message formatting facility to maintain messages within said first column in relative vertical positions that indicate a relative chronology of said messages within said first column.

17. The program product according to claim 16, wherein said message formatting facility includes a chronological presentation mode which causes said message formatting facility to maintain said first and second messages in said first and second columns in relative vertical positions that indicate a relative chronology of said first and second messages.

18. The program product according to claim 13, wherein:
said workstation is a first workstation, said display device is a first display device, and said message window is a first message window;
said window generator also displays a second message window in a second display device of a second workstation; and
in response to operator input requesting consolidation of said first and second columns, said message formatting facility causes said first and second messages to be displayed in a single column within each of said first and second message windows, wherein vertical positions of said first and second messages indicate a relative chronology of said first and second messages.

19. The program product according to claim 12 further comprising:
a sub-topic generator that creates a new sub-topic identifier having an associated new presentation format in response to operator input; and
an automatic label generator for automatically associating a default label with said new sub-topic identifier, such that said default label is displayed in said display device utilizing said new presentation format.

20. The program product according to claim 12 further comprising:
a sub-topic generator that creates a new sub-topic identifier having an associated new presentation format in response to operator input; and
a label entry facility for associating an operator-specified label with said new sub-topic identifier, such that said operator-specified label is displayed in said display device utilizing said new presentation format.

21. The program product according to claim 12, wherein:
said workstation is a first workstation, said display device is a first display device, and said message window is a first message window;
said window generator and said message formatting facility display said first and second messages utilizing said first and second presentation formats, respectively, within a second message window in a second display device of a second workstation; and
said message formatting facility includes a message alteration facility that causes said first message to be displayed utilizing said second presentation format in lieu of said first presentation format within said first and second message windows in response to operator input associating said first message with said second sub-topic identifier in lieu of said first sub-topic identifier.

22. The program product according to claim 21, wherein:
said message formatting facility causes each message associated with said first sub-topic identifier to be displayed in a first column within said first and second message windows;
said message formatting facility causes each message associated with said second sub-topic identifier to be displayed in a second column within said first and second message windows; and
said message alteration facility causes said first message to be displayed in said second column in lieu of said first column in a vertical position that corresponds to a relative chronology of said first and second messages.

23. A data processing system that manages operator intercommunication in a collaborative data processing environment, said data processing system comprising:
a processor and a memory in communication with said processor;
a display device in communication with said processor; and
an intercommunication manager stored in said memory and executable by said processor, said intercommunication manager including:
a window generator for displaying a message window for a discussion forum in said display device, said discussion forum having a plurality of participants at respective display devices of at least one data processing system, each participant having access to all messages of said discussion forum;
a message acquisition facility for receiving first and second messages and respectively associated first and second sub-topic identifiers from said discussion forum; and
a message formatting facility for displaying each message associated with said first sub-topic identifier within in said message window utilizing a first presentation format and for displaying each message associated with said second sub-topic identifier within said message window utilizing a second presentation format.

24. A data processing system that manages operator intercommunication in a collaborative data processing environment, said data processing system comprising:
a processor and a memory in communication with said processor;
a display device in communication with said processor; and
an intercommunication manager stored in said memory and executable by said processor, said intercommunication manager including:
a window generator for displaying a message window in said display device;

a message acquisition facility for receiving first and second messages and respectively associated first and second sub-topic identifiers from a discussion forum; and a message formatting facility for displaying each message associated with said first sub-topic identifier within in said message window utilizing a first presentation format and for displaying each message associated with said second sub-topic identifier within said message window utilizing a second presentation format, wherein said message formatting facility displays each message associated with said first sub-topic identifier in a first column within said message window and each message associated with said second sub-topic identifier in a second column within said message window.

25. The data processing system according to claim 24, wherein said message formatting facility automatically scrolls said first column horizontally in response to receipt of said second message.

26. The data processing system according to claim 24, wherein:

said message acquisition facility includes means for receiving a third message and an associated third sub-topic identifier from said discussion forum; and said message formatting facility includes:
means for assigning each message associated with said third sub-topic identifier to a third column;
a column-age evaluator that automatically ascertains which column among said first column and said second column was a least recently updated column; and
an automatic column exchanger that automatically causes said third column to be displayed within said message window in lieu of said least recently updated column.

27. The data processing system according to claim 24, wherein said message formatting facility includes a compressed presentation mode which causes said message formatting facility to maintain messages within said first column in relative vertical positions that indicate chronology of said messages within said first column.

28. The data processing system according to claim 27, wherein said message formatting facility includes a chronological presentation mode which causes said message formatting facility to maintain said first and second messages in said first and second columns in relative vertical positions that indicate chronology of said first and second messages.

29. A collaborative communications system that manages intercommunication among data processing system operators, said collaborative communications system comprising:

a data processing system having a first display device and a first message window according to claim 24;

a workstation having a second display device for displaying said first and second messages in first and second columns, respectively, within a second message window in said second display device; and a network infrastructure connecting said data processing system and said workstation; and wherein:
in response to operator input requesting consolidation of said first and second columns, said message formatting facility causes said first and second messages to be displayed in a single column within each of said first and second message windows in vertical positions that indicate a relative chronology of said first and second messages.

30. The data processing system according to claim 23, wherein said intercommunication manager further comprises:

a sub-topic generator that creates a new sub-topic identifier having an associated new presentation format in response to operator input; and an automatic label generator for automatically associating a default label with said new sub-topic identifier, such that said default label is displayed in said display device utilizing said new presentation format.

31. The data processing system according to claim 23, wherein said intercommunication manager further comprises:

a sub-topic generator that creates a new sub-topic identifier having an associated new presentation format in response to operator input; and a label entry facility for associating an operator-specified label with said new sub-topic identifier, such that said operator-specified label is displayed in said display device utilizing said new presentation format.

32. A collaborative communications system that manages intercommunication among data processing system operators, said collaborative communications system comprising:

a data processing system having a first display device and a first message window according to claim 23;

a workstation having a second display device for displaying said first and second messages utilizing said first and second presentation formats, respectively, within a second message window in said second display device; and a network infrastructure connecting said data processing system and said workstation; and wherein:
said message formatting facility includes a message alteration facility that causes said first message to be displayed in said second presentation format in lieu of said first presentation format within each of said first and second message windows in response to operator input associating said first message with said second sub-topic identifier in lieu of said first sub-topic identifier.

33. A collaborative communications system according to claim 32, wherein:

said message formatting facility causes each message associated with said first sub-topic identifier to be displayed in a first column within said first and second message windows;

said message formatting facility causes each message associated with said second sub-topic identifier to be displayed in a second column within said first and second message windows; and said message alteration facility causes said first message to be displayed in said second column in lieu of said first column in a vertical position that corresponds to a relative chronology of said first and second messages.

* * * * *